United States Patent [19]

Yokota et al.

[11] Patent Number: 6,023,575
[45] Date of Patent: Feb. 8, 2000

[54] METHOD OF SIMULATING SEMICONDUCTOR DEVICE

[75] Inventors: Ikuhiro Yokota; Takahiro Iizuka, both of Tokyo, Japan

[73] Assignee: NEC Corporation, Tokyo, Japan

[21] Appl. No.: 09/058,348

[22] Filed: Apr. 10, 1998

[30] Foreign Application Priority Data

Apr. 11, 1997 [JP] Japan ................................. 9-110325

[51] Int. Cl.⁷ ................................................. G06F 17/16
[52] U.S. Cl. ................................. 395/500.33; 395/500.23
[58] Field of Search ..................... 395/500.27, 500.34, 395/500.23, 500.33; 357/60; 257/439

[56] References Cited

U.S. PATENT DOCUMENTS 5,627,772  5/1997  Sonoda et al. .......................... 364/578
5,819,073  10/1998  Nakamura ............................... 395/500

OTHER PUBLICATIONS

D. Chang et al., "Simplified Energy–Balance Model for Pragmatic Multi–Dimensional Device Simulation", pp.1795–1802, Solid–State Electronics, vol. 41, No. 11, 1997.

K. W. Chai et al., "Hydrodynamic Simulation of Electron Heating in Conventional and Lightly–Doped–Drain Mosfets with Application to Substrate Current Calculation", pp. 53–66, International Journal of Numerical Modelling: Electronic Networks, Devices and Fields, vol. 5, No. 1, Feb. 1992.

H. Kosina et al., "Device Modelling for the 1990s", pp. 217–233, Microelectronics Journal, vol. 26, No. 2, Mar. 1995.

J.J Liou, "Semiconductor device physics and modelling Part 1: Overview of fundamental theories and equations", pp. 646–660, IEE Proceedings–G, vol. 139, No. 6, Dec. 1992.

R. Thoma et al., "Hydrodynamic Equations for Semiconductors with Nonparabolic Band Structure", pp. 1343–1353, IEEE Transactions on electron Devices, vol. 38, No. 6, Jun. 1991.

R.K. Cook, "Numerical Simulation of Hot–Carrier Transport in Silicon Bipolar Transistors", pp. 1103–1110, IEEE Transactions on Electron Devices, vol. Ed–30, No. 9, Sep. 1983.

*Primary Examiner*—Kevin J. Teska
*Assistant Examiner*—Thai Phan
*Attorney, Agent, or Firm*—Young & Thompson

[57] ABSTRACT

The present invention provides a method of numeral simulation to a semiconductor device for solving an energy transport model by a coupled method, wherein initial values of carrier temperatures are calculated from an equation of carrier temperatures and an electric field which has been obtained by solving a drift-diffusion model.

16 Claims, 13 Drawing Sheets

METHOD OF SIMULATING SEMICONDUCTOR DEVICE

BACKGROUND OF THE INVENTION

The present invention relates to a method of simulating a semiconductor device.

The Semiconductor device simulation techniques have been known and disclosed for examples in "Process Device Simulation Technique" Industrial Book, pp. 99–104, 1990, R. Thoma et al. "Hydrodynamic Equations For Semiconductors with Non-parabolic Band Structure", IEEE Transactions on Electron devices, vol. 38, No. 6, pp. 1343–1353, June 1991, and in "A Study on Relaxation Time Application for Semiconductor Device Analysis" SSD 84–68, Vol. 84, No. 180, pp. 31–36, 1984, as well as in K. W. Chai et al. "Hydrodynamic Simulation Of Electron Heating In Conventional And Lightly-Doped-Drain MOSFETs With Application To Substrate Current Calculation" International Journal of Numerical Modelling: Electronic Networks, Devices and Fields, vol. 5, pp. 53–66, 1992 and further in R. K. Cook, "Numerical Simulation Of Hot-Carrier Transport In Silicon Bipolar Transistor", IEEE Transaction On Electron Devices, Vol. 30, No. 9, pp. 1103–1109, 1983.

An outline of the general device simulation will be described as follows. In numerical analysis to semiconductor devices, a drift-diffusion model and an energy transport model may be used. In the drift-diffusion model, carriers, for example, electrons and holes are approximated as fluids. The energy transport model uses approximation in higher order. The device simulation is made in the drift-diffusion model in a steady state, wherein the following equation of conservation of charges, electron current continuous equation, and hole current continuous equation are set.

$$\text{div } D = \rho \quad \text{(equation of conservation of charges)} \tag{1}$$

$$D = \epsilon E \tag{2}$$

$$E = -\text{grad}\upsilon \tag{3}$$

$$\rho = q(p - n + N_D - N_A) \tag{4}$$

D: electric displacement
$\rho$: density of charge
E: electric field
$\epsilon$: dielectric constant
q: magnitude of electronic charge
p: hole concentration
n: electron concentration
$N_D$: donor concentration
$N_A$: acceptor concentration $$\text{div } Jn = q(R-G) \quad \text{(electron current continuous equation)} \tag{5}$$

$$\text{div } Jp = -q(R-G) \quad \text{(hole current continuous equation)} \tag{6}$$

Jn: electron current
Jp: hole current
R: carrier recombination term
G: carrier generation term $$Jn = q\, n\, \mu n\, E + q\, Dn\, \text{grad}(n) \tag{7}$$

$$Jp = q\, p\, \mu p\, E - q\, Dp\, \text{grad}(p) \tag{8}$$

$\mu n$: electron mobility
$\mu p$: hole mobility
Dn: electron diffusion coefficient
Dp: hole diffusion coefficient $$Dn = \mu n\, \{(k_B T)/q\} \tag{9}$$

$$Dp = \mu p\, \{(k_B T)/q\} \tag{10}$$

$k_B$: Boltzmann's constant
T: lattice temperature

In the above equations, variables to be solved are the potential $\upsilon$, the electron concentration n, and hole concentration p.

For the energy transport model in the steady state, the following equation is set wherein the equation of the drift-diffusion model is added with the carriers energy conservation equations.

$$\text{div } D = \rho \quad \text{(equation of conservation of charges)} \tag{11}$$

$$D = \epsilon E \tag{12}$$

$$E = -\text{grad}\upsilon \tag{13}$$

$$\rho = q(p - n + N_D - N_A) \tag{14}$$

$$\text{div } Jn = q(R-G) \quad \text{(electron current continuous equation)} \tag{15}$$

$$\text{div } Jp = -q(R-G) \quad \text{(hole current continuous equation)} \tag{16}$$

$$Jn = q\, n\mu n\, E + \mu n\, (\tau_{in}/\tau^*_{in})\, \text{grad}(n\, k_B T^*_n) \tag{17}$$

$$Jp = q\, p\mu p\, E - \mu p\, (\tau_{ip}/\tau^*_{ip})\, \text{grad}(p\, k_B T^*_p) \tag{18}$$

$T^*_n$: electron temperature
$T^*_p$: hole temperature
$\tau_{in}$: electron momentum relaxation time
$\tau_{ip}$: hole momentum relaxation time $$\tau^*_{in} = (1/3) m^*_n\, (M_n^{-1})\, \tau_{in} \tag{19}$$

$$\tau^*_{ip} = (1/3) m^*_p\, (M_p^{-1})\, \tau_{ip} \tag{20}$$

$m^*_n$: electron effective mass
$m^*_p$: hole effective mass
$M_n^{-1}$: electron inversion effective mass tensor
$M_p^{-1}$: hole inversion effective mass tensor
( ): average operation in k space $$\text{div } Sn = -Jn\, \text{grad}\upsilon - (3/2) k_B\, n\, \{(T^*_n - T_{neq})/\tau^*\text{wn}\} \tag{21}$$

(electron energy conservation)

$$\text{div } Sp = Jp\, \text{grad}\upsilon - (3/2) k_B p\, \{(T^*_p - T_{pcq})/\tau^*\text{wp}\} \tag{22}$$

(hole energy conservation)
Sn: electron energy flow density
Sp: hole energy flow density
$T_{neq}$: electron equilibrium temperature
$T_{peq}$: hole equilibrium temperature $$\tau^*_{wn} = (3/2) k_B (T^*_n - T_{eq})\{T_{wn}(\,(\epsilon_n)\,(\epsilon_{neq})\,)\} \tag{23}$$

$$\tau^*_{wp} = (3/2) k_B (T^*_p - T_{eq})\{T_{wp}(\,(\epsilon_p)\,(\epsilon_{peq})\,)\} \tag{24}$$

$(\epsilon_n)$: mean electron energy
$(\epsilon_p)$: mean hole energy
$(\epsilon_{neq})$: electron equilibrium energy
$(\epsilon_{peq})$: hole equilibrium energy
$\tau^*_{wn}$: electron energy relaxation time
$\tau^*_{wp}$: hole energy relaxation time $$Sn = -5/2 (k_B\, T^*_n/q)\, (\tau^*_{sn}/\tau^*_{in})\, \{Jn + (q/m^*_n)\, \tau_{in} n\, \text{grad}\,(k_B T^*_n)\} \tag{25}$$

$$Sp = -5/2 (k_B\, T^*_p/q)\, (\tau^*_{sp}/\tau^*_{ip})\, \{Jp + (q/m^*_p)\, \tau_{ip} p\, \text{grad}\,(k_B T^*_p)\} \tag{26}$$

$$\tau^*_{sn} = (1/3)(M_n^{-1}\epsilon_n + v_n v_n)/(5/6 (v_n^2))\, \tau_{sn} \tag{27}$$

$$\tau^*_{sp} = (1/3)(M_p^{-1}\epsilon_p + v_p v_p)/(5/6 (v_p^2))\, \tau_{sp} \tag{28}$$

$\tau_{sn}$: relaxation time for electron energy flow density Sn
$\tau_{sp}$: relaxation time for hole energy flow density Sp
Vn: electron velocity
Vp : hole velocity In the above equations in energy transport equation model, variables to be solved are potential $\upsilon$, electron concentration n, hole concentration p, electron temperature $T^*_n$, and hole temperature $T^*_p$. Whereas the mark * has been put to distinguish the above temperatures from the temperatures as defined in the thermodynamics, such mark will be omitted hereinafter.

$$Tn=2/(3\ k_B)\ (\epsilon_n) \quad (29)$$

$$Tp=2/(3\ k_B)\ (\epsilon_p) \quad (30)$$

Biases are sequentially renewed by setting designated plural applied devices as boundary conditions in order to calculate the five equations of equation of conservation of charges, electron current continuous equation, hole current continuous equation, electron energy conservation equation and hole energy conservation equation.

Since those equations are non-linear equations, the solutions are found by Newton method as follows.

If the following equation (31) has been given for variable "x" and addition of a variable $\delta x0$ to $x0$ provides the solution, then the following equation (32) is given.

$$F(x)=0 \quad (31)$$

$$F(x0+\delta x0)=0 \quad (32)$$

The differential coefficient of F(x) is defined to be F'(x0) and Taylor expansion is made in the first order to F(x0+δx0) for δx0 to give the following equations.

$$F(x0+\delta x0)=F(x)+F'(x0)\delta x0=0 \quad (33)$$

$$\delta x0=-F(x0)/F'(x0) \quad (34)$$

The following equation (35) is set for similar calculation for x1.

$$X1=X0+\delta x0 \quad (35)$$

The above calculation will be repeated so that if δxi is smaller than convergence condition $\epsilon$, this means convergence. xi is considered to be the solution of the equation (31).

FIG. 1 is a flow chart illustrative of the above calculations. FIG. 2, is a graph illustrative of a relationship of F(x) and x. x approaches from the initial value x0 to the solution xi. Tangential lines with the function curve y=F(x) are set to find intersection points of the tangential lines and the x-axis. The intersection point is set to be the next value of x. If the initial value x0 is close to the solution, then the number of the required interating calculations is small and it takes a short time to obtain the solution. This means that the initial value x0 closer to the solution is better initial value.

Whereas in the above descriptions to the Newton method, the single variable is dealt with, in the device simulation, meshes are formed over entire analysis regions so that equations are set for variables on the meshes. FIG. 3 is a view illustrative of a mesh for analysis. Each of the five parameters, for example, potential, electron concentration, hole concentration, electron temperature and hole temperature represents variables, the number of which corresponds to the number of the points N of the mesh. This means that 5N simultaneous equations are solved. The above charge conservation equation, electron current continuous equation, hole current continuous equation, electron energy conservation equation and hole energy conservation equation are expressed as follows.

$$F\upsilon(\upsilon, n, p, Tn, Tp)=0 \text{ (charge conservation equation)} \quad (36)$$

$$Fn(\upsilon, n, p, Tn, Tp)=0 \text{ (electron current continuous equation)} \quad (37)$$

$$Fp(\upsilon, p, Tn, Tp)=0 \text{ (hole current continuous equation)} \quad (38)$$

$$FTn(\upsilon, n, p, Tn, Tp)=0 \text{ (electron energy conservation equation)} \quad (39)$$

$$FTp(\upsilon, n, p, Tn, Tp)=0 \text{ (hole energy conservation equation)} \quad (40)$$

where $\upsilon$ is the potential, n is the electron concentration, p is the hole concentration, Tn is the electron temperature, and Tp is the hole temperature, and each represents N variables.

In the above cause, there may be used a coupled method and a de-coupled method. In accordance with the coupled method, the above five simultaneous equations are concurrently solved for all of the variables. By contrast, in accordance with the de-coupled method, the above five equations are separately solved for individual variables.

FIG. 4 is a flow chart illustrative of the procedure of the coupled method. FIG. 5 is a flow chart illustrative of the procedure of the decoupled method. Fυn' represents the following partial differential.

$$F\upsilon n'=(\partial F\upsilon/\partial n) \quad (41)$$

In accordance with the coupled method, the above five simultaneous equations are concurrently solved for all of the variables.

On the other hands, in accordance with the de-coupled method, all variables except for the currently attracted variable are fixed to solve the equations. If, for example, the electron energy conservation equation is solved by setting electron temperature as variable but fixing the potential, the electron concentration, hole concentration and hole temperature.

In each iteration, the matrix is calculated. In the coupled method, for the single iteration, a single matrix of N×N is solved. By contrast, in the de-coupled method, five matrixes of N×N are solved.

The coupled method is capable of finding the solution through a small number of iterations. The result of the calculation by the coupled method is largely dependent upon the initial value. Notwithstanding, if the initial value is not proper, then it might be difficult to obtain the convergence.

The de-coupled method is not so dependent upon the initial value, but requires a large number of the iterations of calculations. It takes a shorter time to calculate in a single iterations by the de-coupled method as compared to when the calculation is made by the coupled method. The decoupled method requires a large number of the iterations of the calculations as compared to when the calculation is made by the coupled method.

In the majority case, the required calculation time for obtaining the solution is shorter when the calculation is made by the coupled method as compared to when the calculation is made by the de-coupled method. If the better initial value can be given, it can take a shorter time to analyze the semiconductor device through the coupled method. This means that it is important to set the better initial value for calculation through the coupled method.

A control volume method may be used for discretization from the equations into the analysis mesh. FIG. 6 is a diagram illustrative of the polygon which comprises a plurality of triangle meshes which are represented by real lines. Bisectors of individual mesh edges of the triangle meshes form another polygon which represents the control volume. Vertexes of the control volume polygon correspond to circumcenters of the triangle meshes, namely centers of the circumscribing circles.

In the control volume method, the flow of the physical quantities such as current can be expressed by the product of the density of the physical quantity flow over the mesh edge such as current density and the length of the side of the control volume polygon. In the two dimensional case, in place of the length of the side of the control volume polygon, cross section is used.

The following description will focus on the prior art for estimation of the initial value of the energy transport model analysis. For the energy transport model analysis, it is preferable to set initial values of an electron temperature and a hole temperature to be closer to the solutions.

In a first conventional estimation method, the thermal equilibrium temperatures are set as initial values of the carrier temperatures and may expressed by the following equations. FIG. 7 is a flow chart illustrative of the procedures of the first conventional estimation method.

$$Tnk=Tneq\ (k=1-N) \quad (42)$$

$$Tpk=Tpeq\ (k=1-N) \quad (43)$$

In the energy transport model analysis, as a bias is applied to electrode of the semiconductor device, the carrier temperatures are increased to become different from the thermal equilibrium temperatures, for which reason the initial value is likely to be set far from the solution under the bias applied condition, resulting in a deterioration of the convergence.

In a second conventional estimation method, the analysis is approximately made to obtain the initial value. The procedures will be described with reference to FIG. 8 which is a flow chart illustrative of the procedures of the second conventional estimation method. In a first step 1201, a bias condition is set. In a second step 1202, the drift-diffusion model is solved under the bias condition to obtain a potential, an electron concentration and a hole concentration. In a third step 1203, the obtained potential and electron and hole concentrations are used to solve the electron energy conservation equation and the hole energy conservation equation thereby to obtain an electron temperature and a hole temperature. In a fourth step 1204, the obtained electron temperature and hole temperature are defined to be carrier temperature initial values.

In the above conventional method, the energy conservation equation is solved one time, for which reason it is possible to obtain the initial value relatively close to the solution. Since, however, calculation is made by use of the matrix to solve the energy conservation equation, it takes a long time to make the required calculation.

In a third conventional estimation method, the solution having been obtained by analysis under the previous bias condition is set to be the initial value. FIG. 9 is a flow chart illustrative of the procedures of the first conventional estimation method. In a first step 1301, for initial bias conditions, thermal equilibrium temperatures are set to be initial values of the carrier temperatures to calculate the energy transport model as the transitional analysis to the applied bias. In a second step 1302, for the second and later bias conditions, the solutions having been obtained by the analysis to the previous bias conditions are set to be the carrier temperature initial values.

In the third conventional method, no calculation to the matrix is made for setting the initial value, for which reason it takes a short time to make the required calculation for the device analysis. If the applied biases have been prepared precisely, it is possible to set the desired initial value which is close to the solution. If, however, the variation in the applied bias is large, the initial value may be far from the solution, resulting in the deterioration of the convergence.

As described above, the first conventional method of estimation of the initial value for energy transport model analysis is engaged with the first problem with deterioration of the convergence under the highly applied bias conditions.

The second conventional method of estimation of the initial value for energy transport model analysis is engaged with the second problem that it takes a long time to make the required calculation for the required analysis.

The third conventional method of estimation of the initial value for energy transport model analysis is engaged with the third problem with deterioration of the convergence under the conditions of the large variation in applied bias.

In the above circumstances, it had been required to develop a novel method of simulating a semiconductor device free from the above problems.

SUMMARY OF THE INVENTION

Accordingly, it is an object of the present invention to provide a novel method of numeral simulation of a semiconductor device free from the above problems.

It is a further object of the present invention to provide a novel method of numerical simulation of a semiconductor device for setting a better initial value which is relatively closer to the solution in a relatively short time.

It is a still further object of the present invention to provide a novel method of numerical simulation of a semiconductor device for high speed and accurate analysis.

It is yet a further object of the present invention to provide a computer-readable storage medium configured by a computer program for causing a computer to perform a numerical simulation of a semiconductor device free from the above problems.

It is a further more object of the present invention to provide a computer-readable storage medium configured by a computer program for causing a computer to perform a numerical simulation of a semiconductor device for setting a better initial value which is relatively closer to the solution in a relatively short time.

It is still more object of the present invention to provide a computer-readable storage medium configured by a computer program for causing a computer to perform a numerical simulation of a semiconductor device for high speed and accurate analysis.

It is moreover object of the present invention to provide a novel programmable apparatus for performing a numerical simulation of a semiconductor device, which comprises a programmable hardware directed by a software for performing the numerical simulation to a semiconductor device, free from the above problems.

It is another object of the present invention to provide a novel programmable apparatus for performing a numerical simulation of a semiconductor device, which comprises a programmable hardware directed by a software for performing the numerical simulation of a semiconductor device by setting a better initial value which is relatively closer to the solution in a relatively short time.

It is still another object of the present invention to provide a novel programmable apparatus for performing a numerical simulation of a semiconductor device, which comprises a programmable hardware directed by a software for performing the numerical simulation to a semiconductor device for high speed and accurate analysis.

It is yet another object of the present invention to provide a novel computer-implemented process for accomplishing a numerical simulation of a semiconductor device, free from the above problems.

It is further another object of the present invention to provide a novel computer-implemented process for accomplishing a numerical simulation of a semiconductor device by setting a better initial value which is relatively closer to the solution in a relatively short time.

It is an additional object of the present invention to provide a novel computer-implemented process for accomplishing a numerical simulation of a semiconductor device for high speed and accurate analysis.

The above and other objects, features and advantages of the present invention will be apparent from the following descriptions.

In accordance with the present invention, the energy transport model is solved by a coupled method (Newton method), wherein initial values of carrier temperatures are calculated from an equation of carrier temperatures and an electric field having been obtained by solving a drift-diffusion model.

An approximate equation obtained by Monte Carlo simulation may optionally be used in the equation of the carrier temperatures and the electric field.

The above novel method allows setting better initial values in a relatively short time for high speed and highly accurate simulations.

In place of the use of a potential for calculating the field, quasi-Fermi potential may be used to calculate the field.

The present invention provides a method of numerical simulation to a semiconductor device for solving an energy transport model by a coupled method, wherein initial values of carrier temperatures are calculated from an equation of carrier temperatures and an electric field which has been obtained by solving a drift-diffusion model.

It is preferable that an approximate equation obtained by Monte Carlo simulation is used in the equation of the carrier temperatures and the electric field.

It is also preferable that quasi-Fermi potentials are used to calculate fields of electron and hole.

The present invention also provides a computer-readable storage medium configured by a computer program for causing a computer to perform a numerical simulation to a semiconductor device for solving an energy transport model by a coupled method, wherein initial values of carrier temperatures are calculated from an equation of carrier temperatures and an electric field which has been obtained by solving a drift-diffusion model.

It is preferable that an approximate equation obtained by Monte Carlo simulation is used in the equation of the carrier temperatures and the electric field.

It is also preferable that potentials or quasi-Fermi potentials are used to calculate fields of electron and hole.

The present invention also provides a programmable apparatus for performing a numerical simulation to a semiconductor device, which comprises a programmable hardware directed by a software for performing the numerical simulation to a semiconductor device for causing a computer to perform a numerical simulation to a semiconductor device for solving an energy transport model by a coupled method, wherein initial values of carrier temperatures are calculated from an equation of carrier temperatures and an electric field which has been obtained by solving a drift-diffusion model.

It is preferable that an approximate equation obtained by Monte Carlo simulation is used in the equation of the carrier temperatures and the electric field.

It is also preferable that potentials or quasi-Fermi potentials are used to calculate fields of electron and hole.

The present invention also provides a computer-implemented process for accomplishing a numerical simulation to a semiconductor device for solving an energy transport model by a coupled method, wherein initial values of carrier temperatures are calculated from an equation of carrier temperatures and an electric field which has been obtained by solving a drift-diffusion model.

It is preferable that an approximate equation obtained by Monte Carlo simulation is used in the equation of the carrier temperatures and the electric field.

It is also preferable that potentials or quasi-Fermi potentials are used to calculate fields of electron and hole.

BRIEF DESCRIPTION OF THE DRAWINGS

Preferred embodiments according to the present invention will be described in detail with reference to the accompanying drawings.

PREFERRED EMBODIMENTS
FIRST EMBODIMENT

Figure 10:
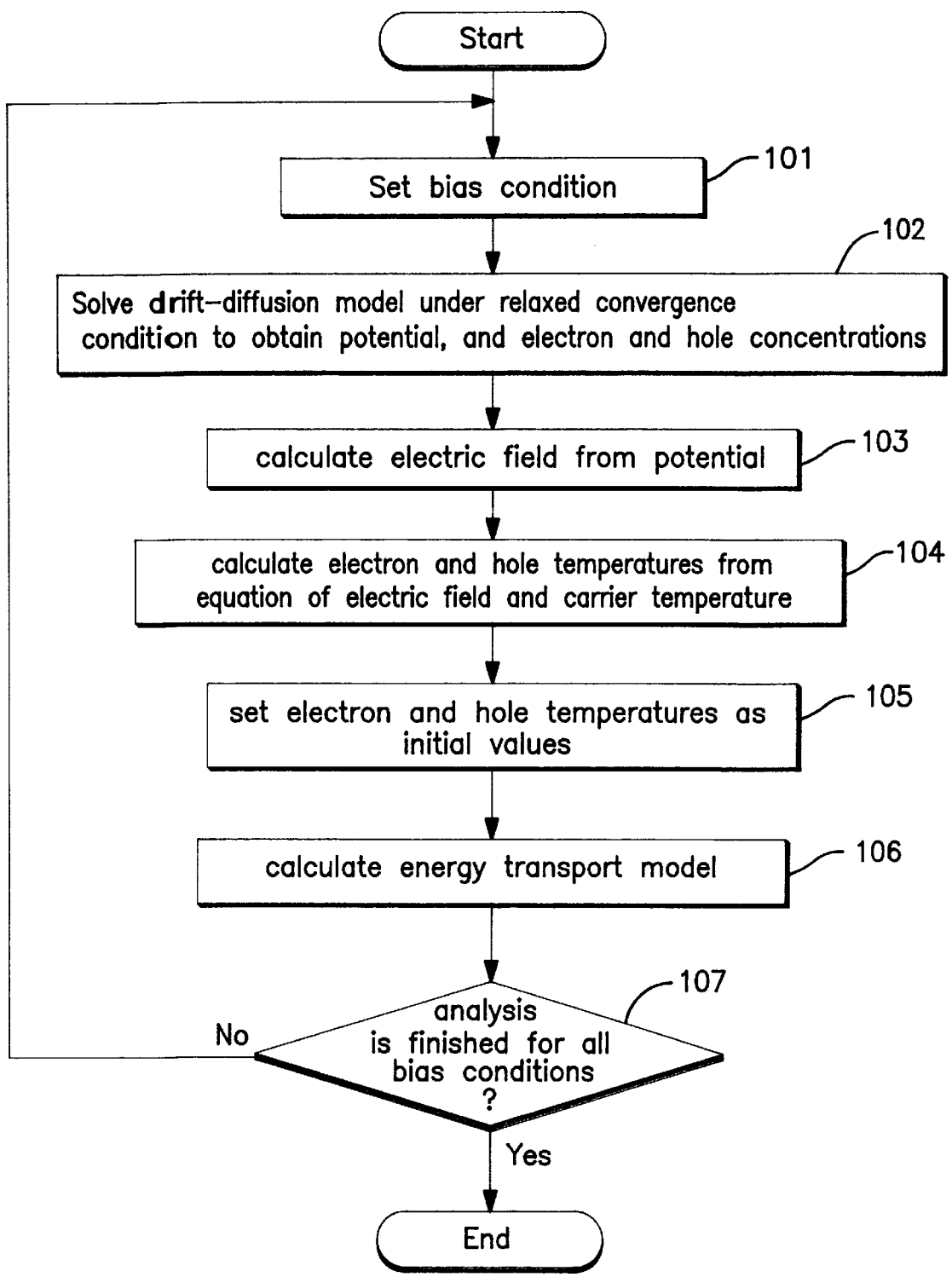
FIG. 10 is a flow chart illustrative of a novel method of numerical simulation to a semiconductor device.

A first embodiment according to the present invention will be described in detail with reference to FIG. 10 which is a flow chart illustrative of a novel method of numerical simulation of a semiconductor device. In a first step 101, individual bias conditions are set. In a second step 102, a drift-diffusion model is solved wherein the convergence condition is relaxed to shorten the required calculation time Not so highly accurate calculation in the drift-diffusion model for obtaining the initial values are required, for which reason the relaxation of the convergence condition does not provide any substantive influence to the result of the calculation.

As a result of the above calculation, the potential, electron concentration and hole concentration are obtained as solutions of the drift-diffusion model and are different from but relatively closer to the solutions of the energy transport model.

In a third step 103, an electric field is calculated by use of the obtained potential. As described above, the potentials are defined by nodes over the mesh. The electric field representing as the gradient of the potential is defined over the mesh edges. If, for example, a mesh edge "1" has opposite points "i" and "j", the field E1 may be expressed by use of the potentials $v_j$ and $v_i$, as follows.

$$E1 = -(v_j - v_i)/L1 \qquad (44)$$

where L1 is the length of mesh edge "1".

In a fourth step 104, carrier temperatures are found from the equation of the obtained electric field and the carrier temperature.

In the normal device simulation, the analysis of the energy transport model is made independently from the hysteresis of the state of the system. In this case, the relationship of the carrier temperature and the field is in one to one correspondence. This means that it is possible to calculate the carrier temperature directly from the field. Namely, the following functions can previously be prepared.

$$Tn=f(E) \quad (45)$$

$$Tp=g(E) \quad (46)$$

It takes much shorter time to calculate the above analytically expressed equation as compared to when the matrix is calculated as described in the prior art. Since the carrier temperature has been obtained from the solution of the drift-diffusion model, the carrier temperature calculated in the above manner is different from but closer to the solution of the energy transport model.

As the equation of the field and carrier temperature, there may be used an approximate equation of the carrier temperature and the field obtained by calculating the carrier transports under a uniform field in Monte Carlo simulation.

In the Monte Carlo simulation, motions of individual particles according to the equation are simulated to calculate time average and set average for obtaining the solution, It is advantageous to use the principal model for calculation and also to obtain statistical data such as carrier velocity distributions. It is, however, disadvantage that it takes a long time to make calculations for an extremely large number of particles.

Figure 1:
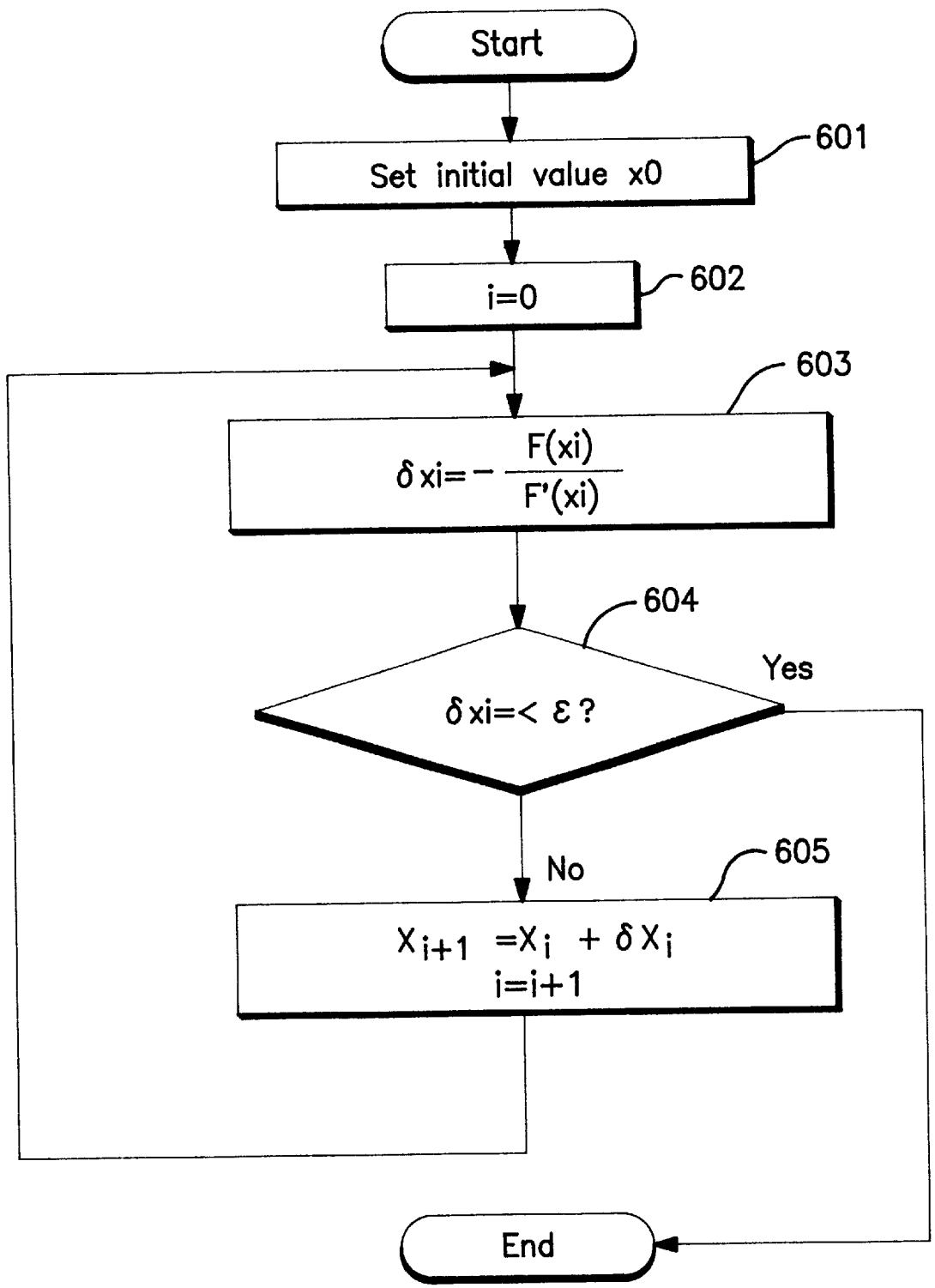
FIG. 1 is a flow chart illustrative of the Newton method.
Figure 2:
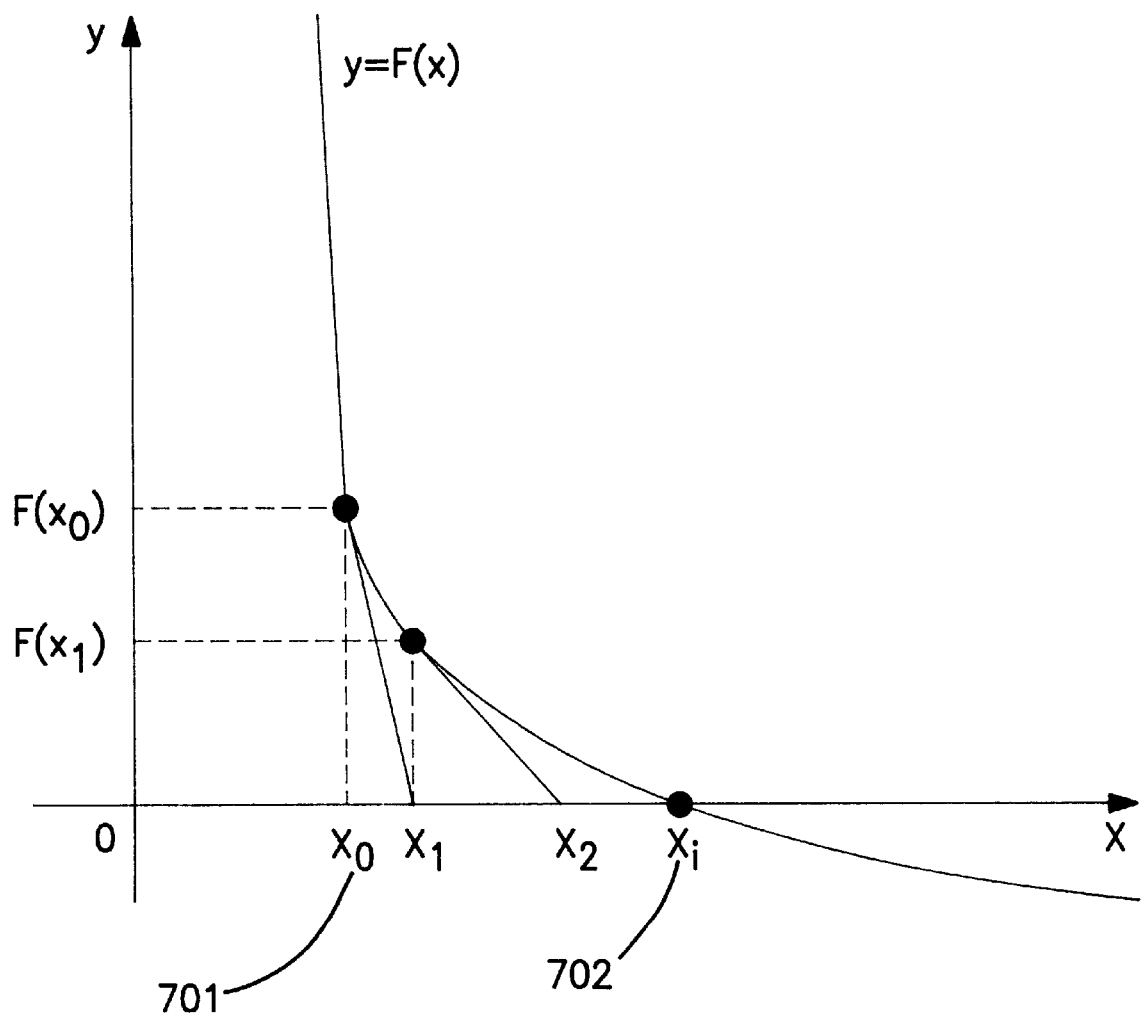
FIG. 2 is a graph illustrative of a relationship of F(x) and x in the Newton method.
Figure 3:
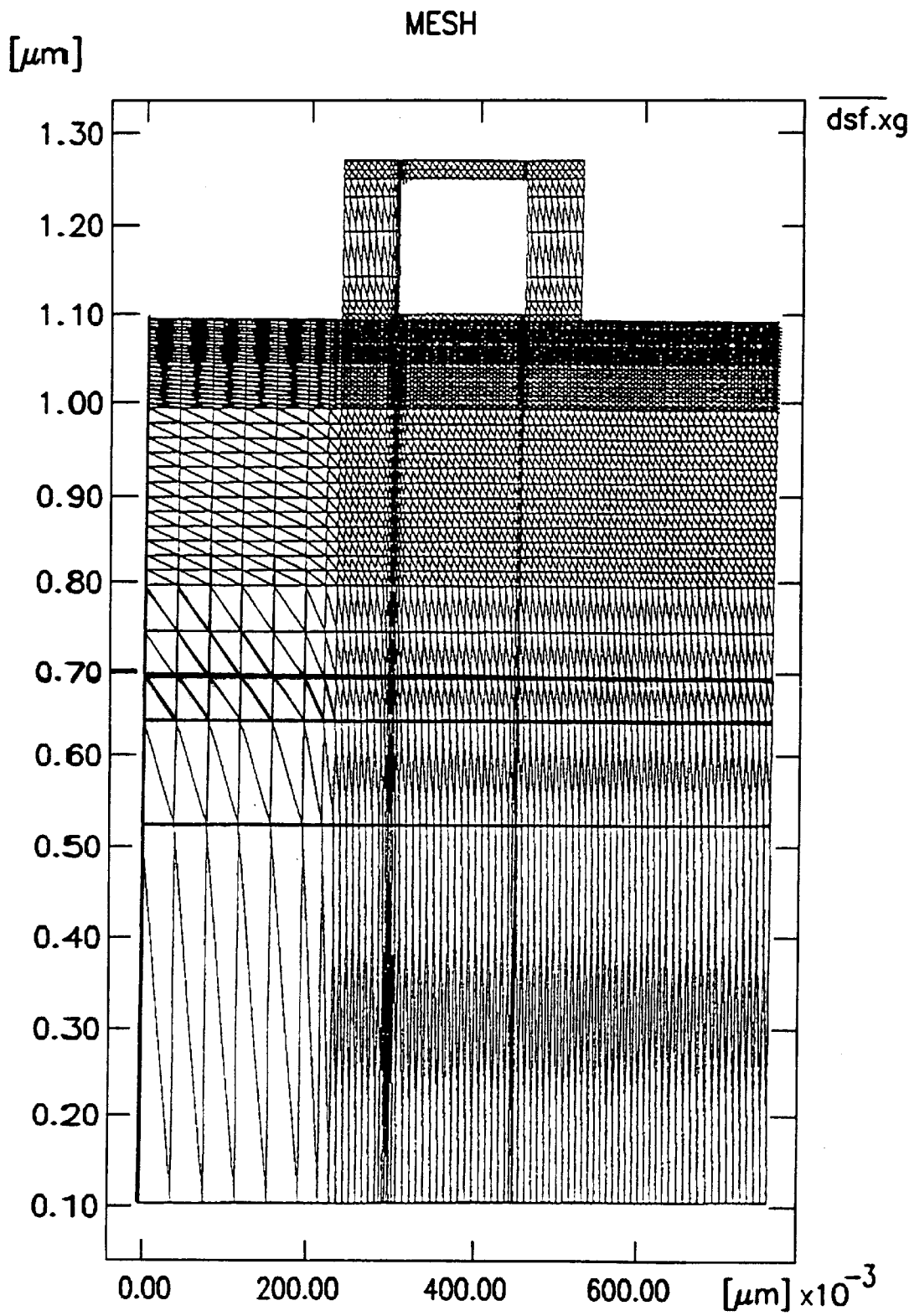
FIG. 3 is a view illustrative of a mesh for analysis.
Figure 4:
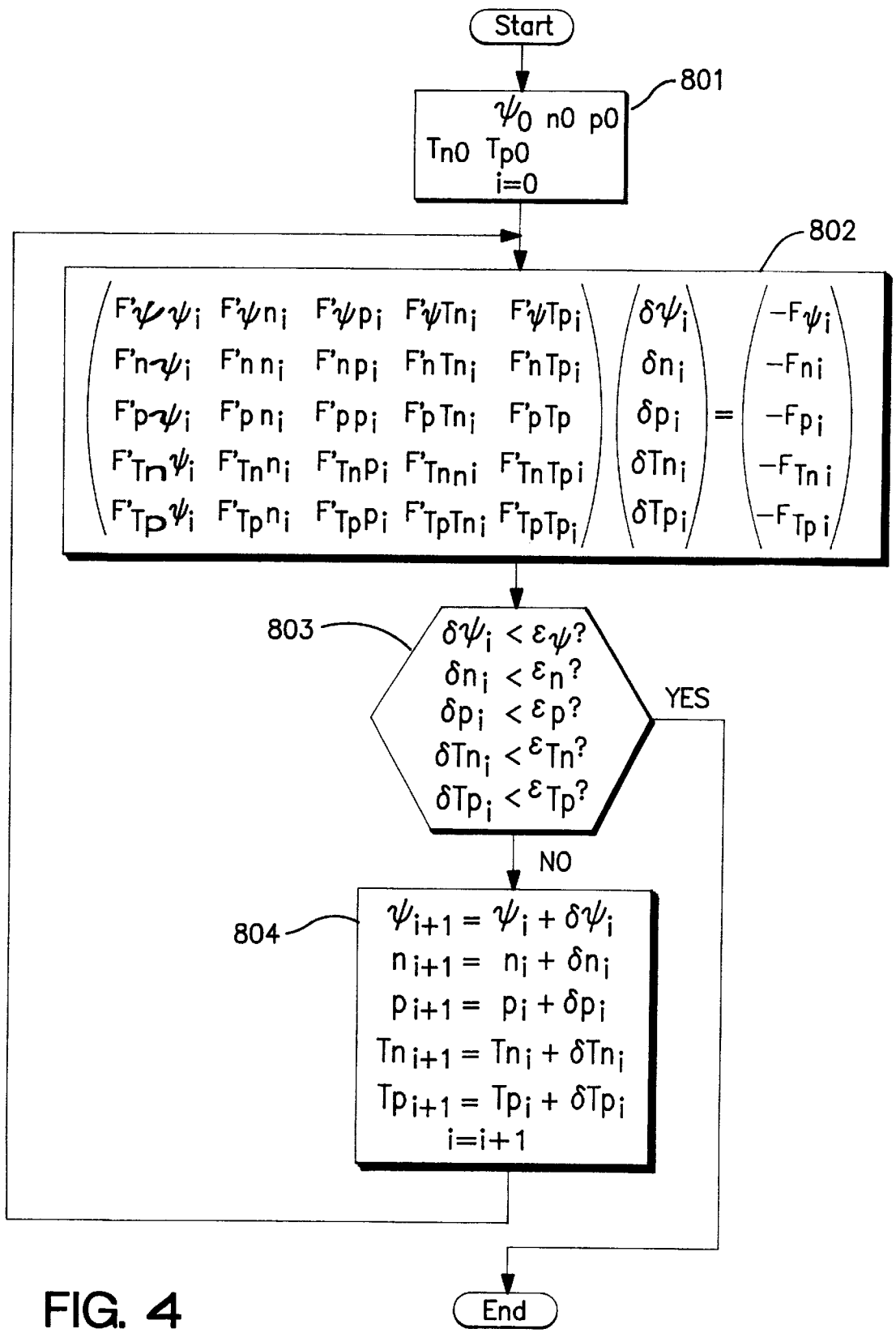
FIG. 4 is a flow chart illustrative of the procedure of the coupled method.
Figure 5:
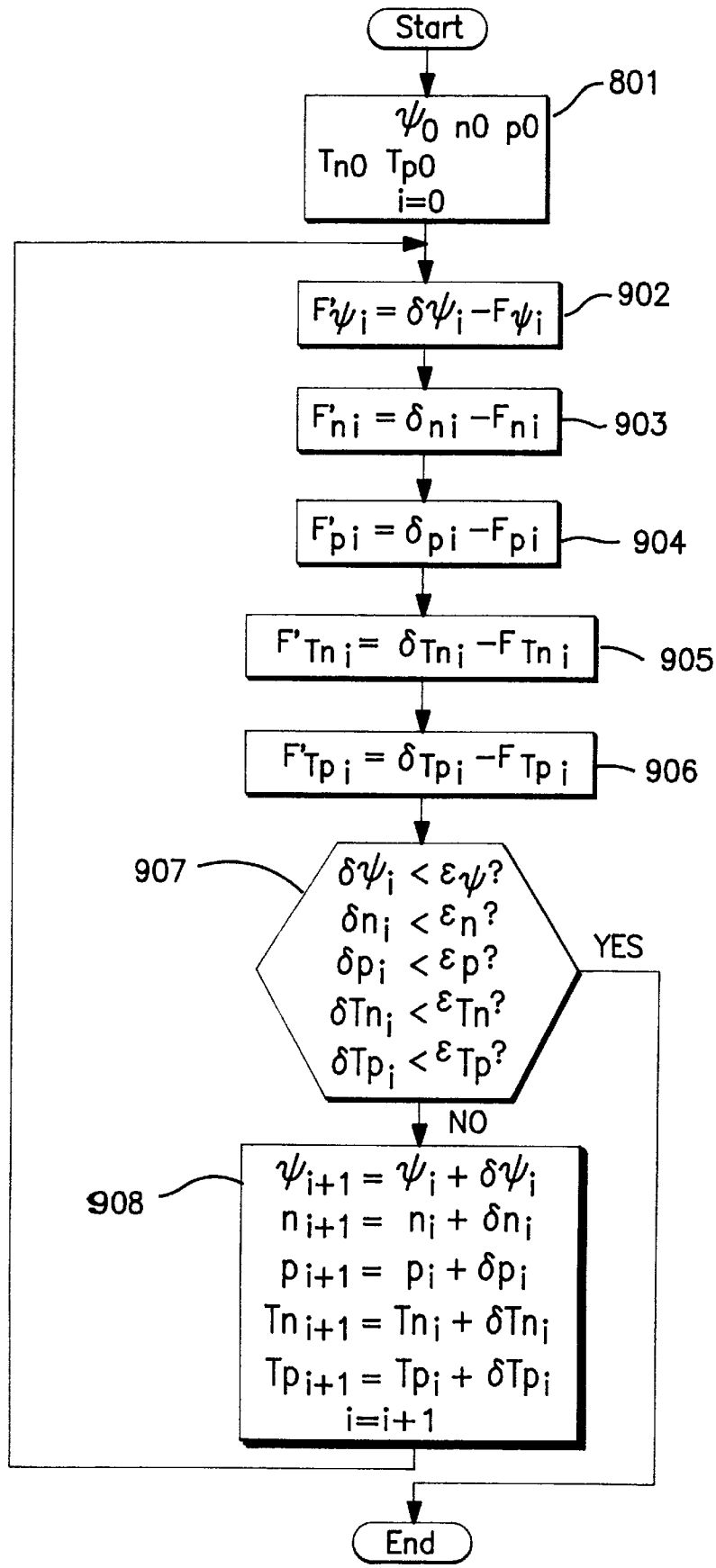
FIG. 5 is a flow chart illustrative of the procedure of the decoupled method.
Figure 6:
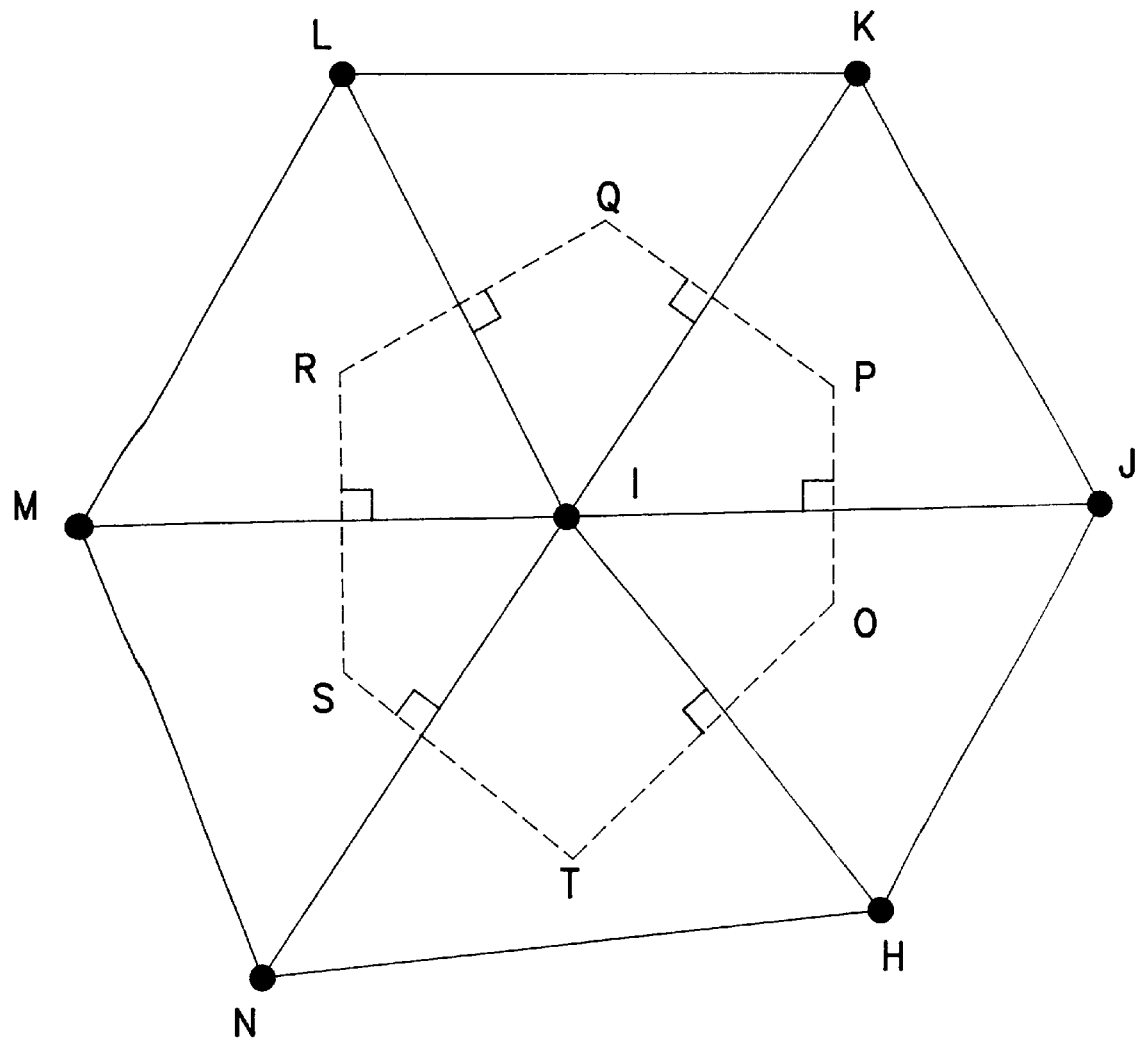
FIG. 6 is a diagram illustrative of the polygon which comprises a plurality of triangle meshes which are represented by real lines.
Figure 7:
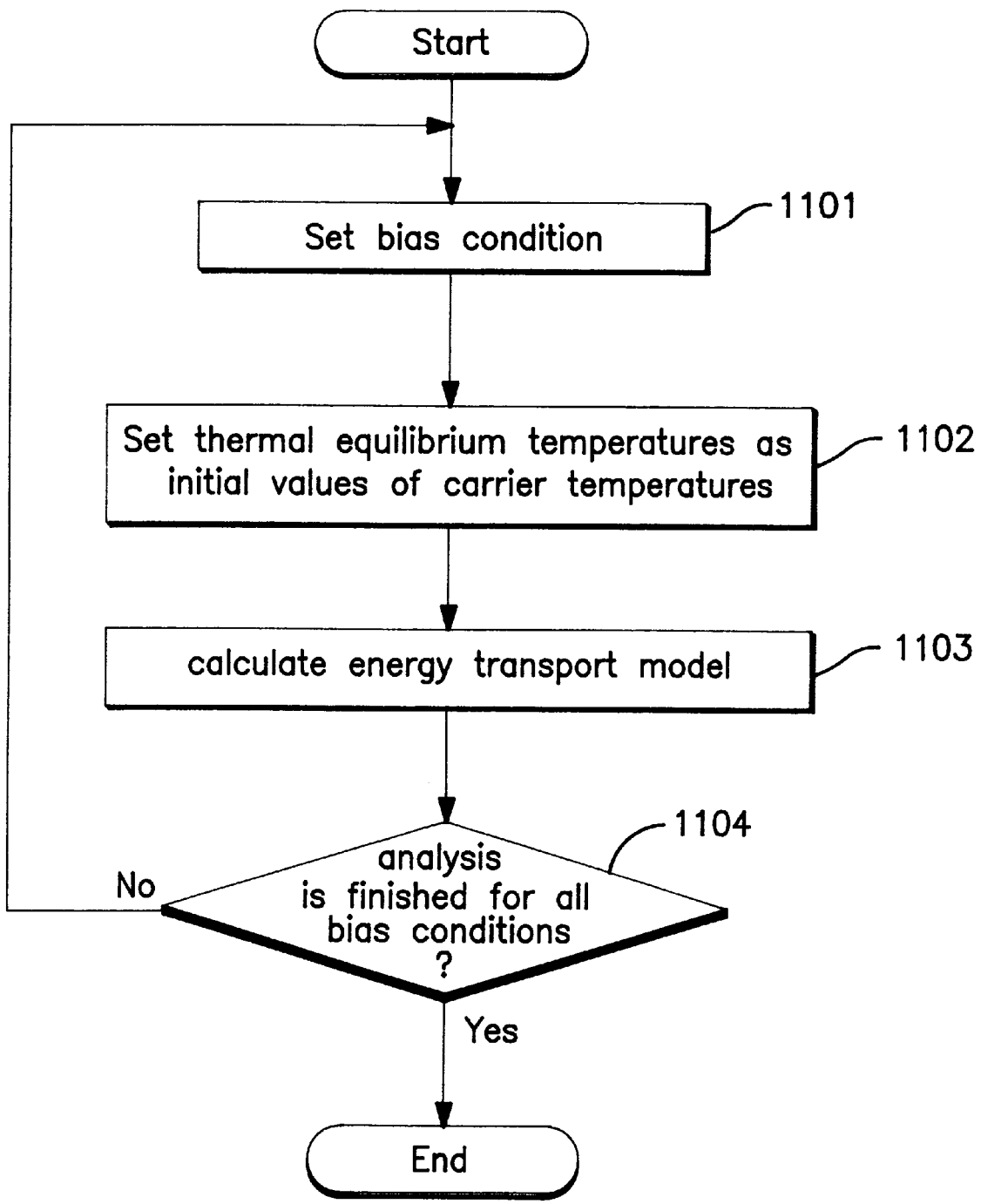
FIG. 7 is a flow chart illustrative of the procedures of the first conventional estimation method.
Figure 8:
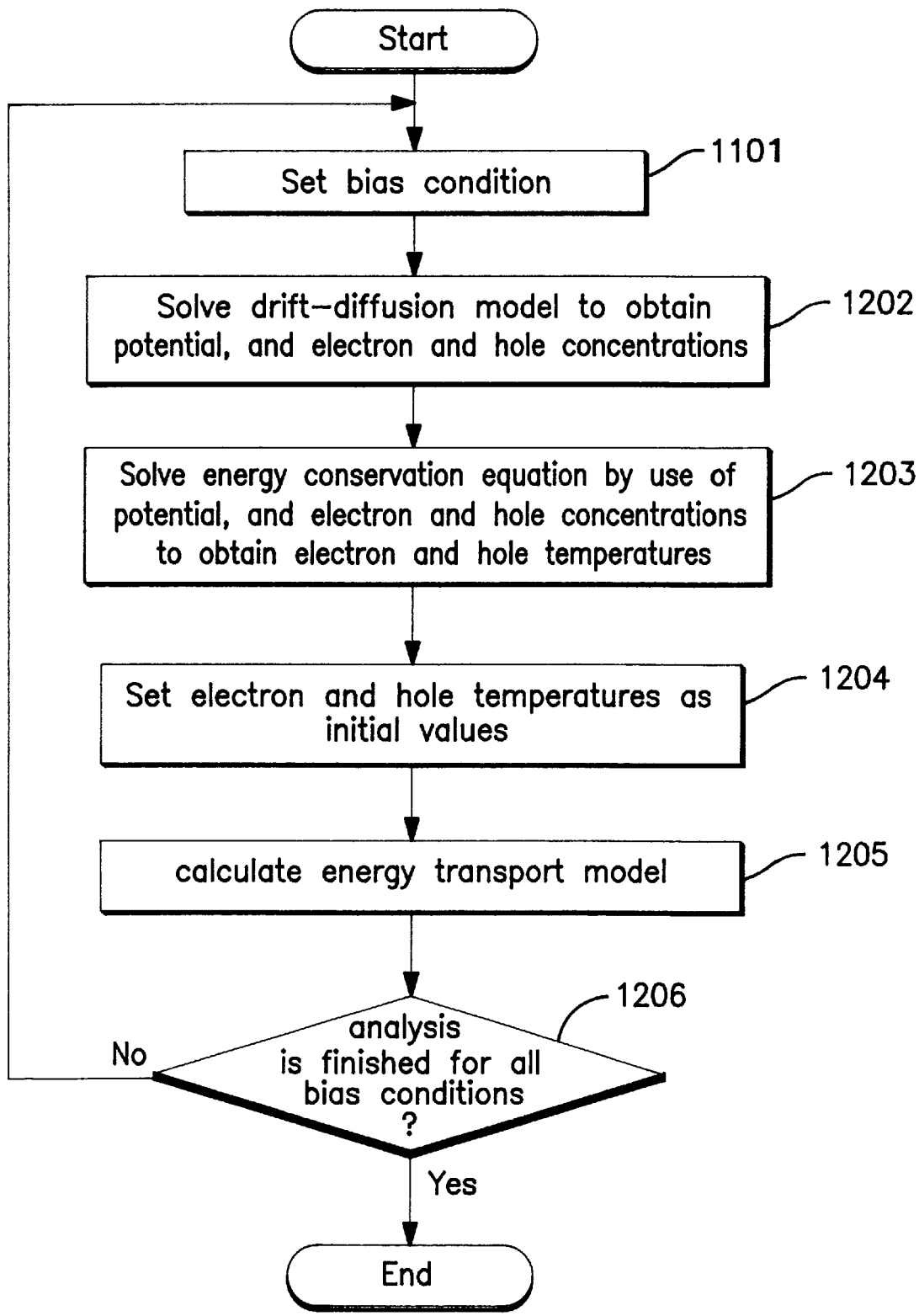
FIG. 8 is a flow chart illustrative of the procedures of the second conventional estimation method.
Figure 9:
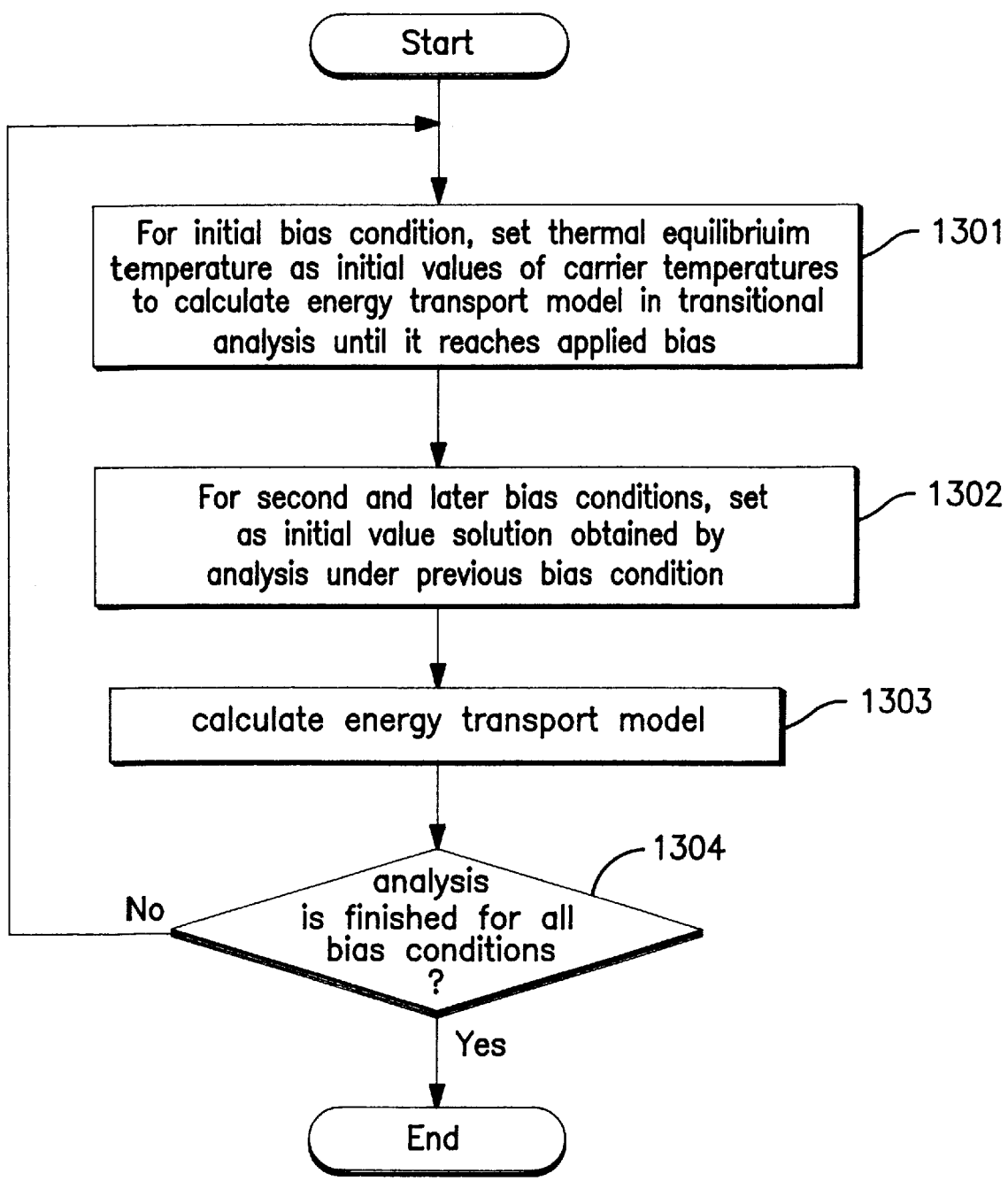
FIG. 9 is a flow chart illustrative of the procedures of the third conventional presumption method.
Figure 11:
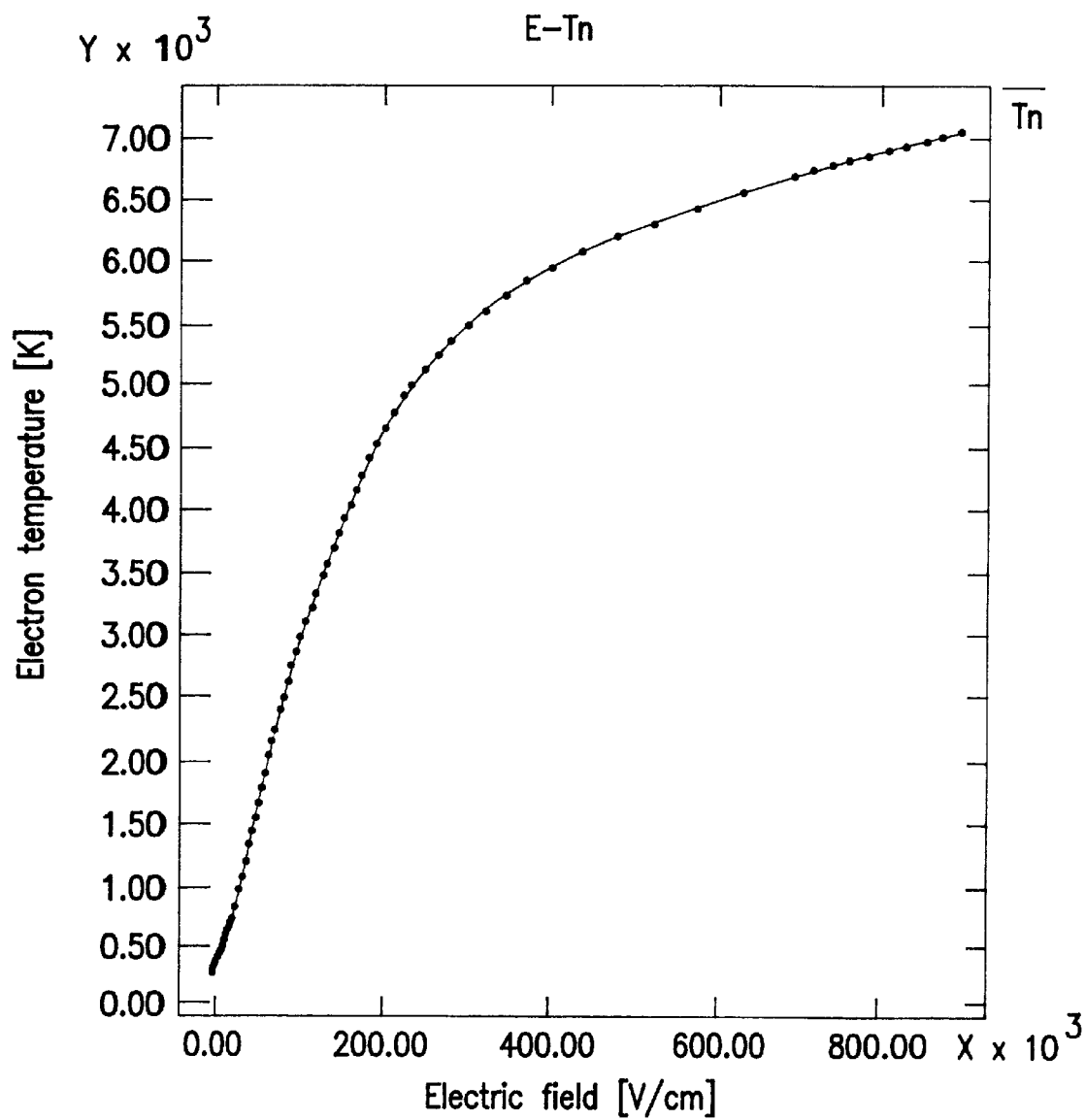
FIG. 11 is a graph illustrative of variations in electron temperature versus field.
Figure 12:
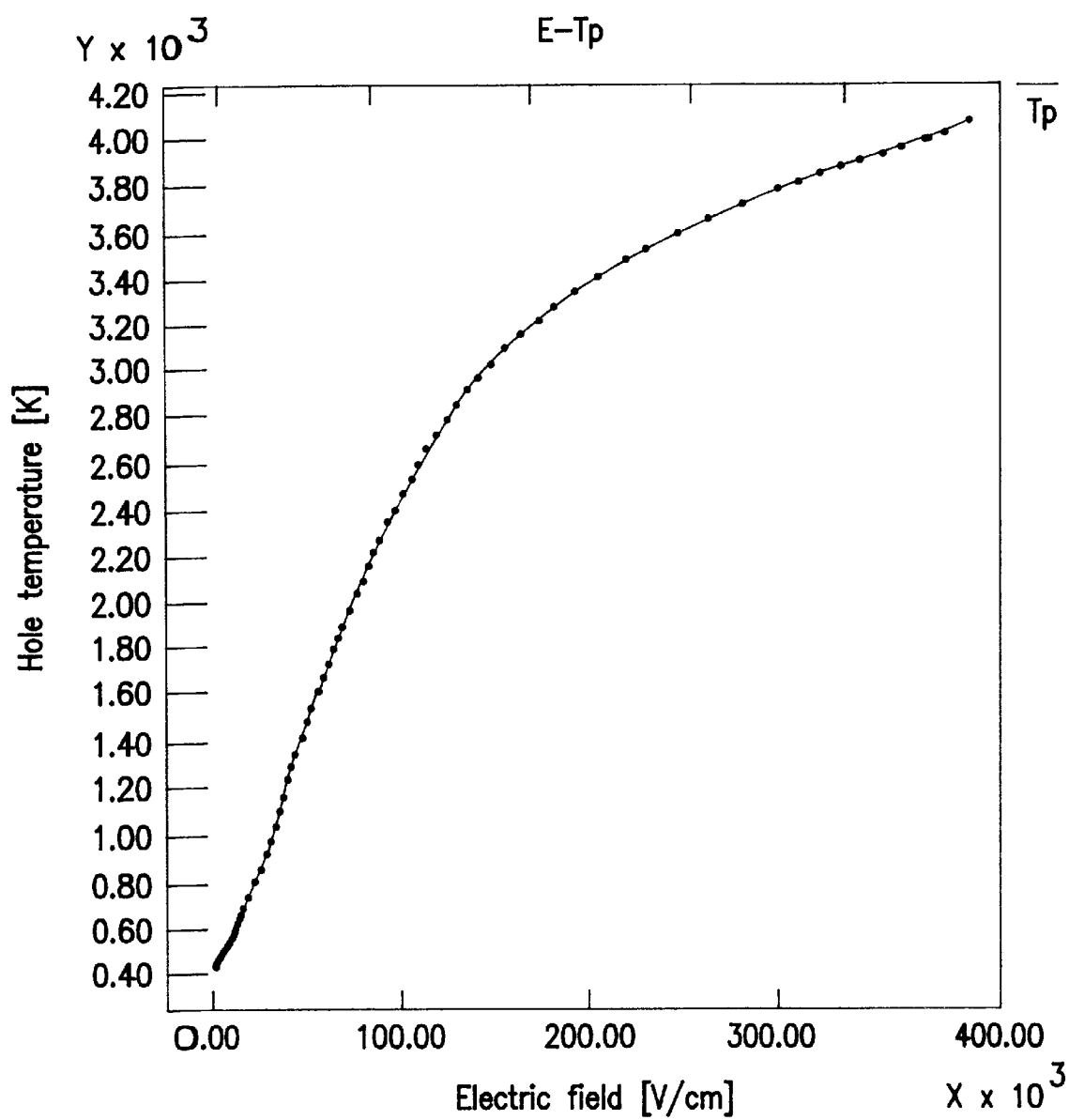
FIG. 12 is a graph illustrative of variations in hole temperature versus field.

The models of the Monte Carlo method are so called as "particle model". By contrast, the above drift-diffusion model and the energy transport models are so called as "fluid model". Through the Monte Carlo method, relationships between the field and the carrier temperatures, for examples, electron temperature and hole temperature are obtained as illustrated in FIGS. 11 and 12. FIG. 11 is a graph illustrative of variations in electron temperature versus field. FIG. 12 is a graph illustrative of variations in hole temperature versus field. Those relationships may be expressed by the following polygonal line approximate equations.

$$Tn=Ani\ (E-Eni)+Tni\ (i=1,\ldots,Mn-1) \quad (47)$$

$$Ani=(Tni+i-Tni)/(Eni-Enj) \quad (48)$$

$$Eni \leq E < Eni+1 \quad (49)$$

$$Tp=Api\ (E-Epi)+Tpi\ (p=1,\ldots,Mp-1) \quad (50)$$

$$Api=(Tpi+i-Tpi)/(Epi+1-Epi) \quad (51)$$

$$Epi \leq E < Epi+1 \quad (52)$$

where Mr and Mp are the numbers of the data in FIGS. 3 and 4 respectively, and (Emi, Tni), (Epi, Tpi) are the data. It is also possible to obtain the carrier temperature by linear extrapolation for data outside of the predetermined extent.

In a fifth step 105, the obtained carrier temperature is set to be the initial value for the energy transport model analysis. Since the field has been defined over the mesh edges, the obtained carrier temperatures are the quantities over the mesh edges. The carrier temperatures are then converted into quantities on the nodes of the mesh. For example, the conversion is made by a mean operation by the control volume as follows.

$$Tni=(\Sigma_1 T_{n1} h_1)/(\Sigma_1 h_1) \quad (53)$$

$$Tpi=(\Sigma_1 T_{p1} h_1)/(\Sigma_1 h_1) \quad (54)$$

where Tni is the electron temperature at the mesh node "i", Tpi is the hole temperature at the mesh node "i", Tni is the electron temperature on the mesh edge extending on the mesh node "i", Tpi is the hole temperature on the mesh edge extending on the mesh node "i", and $h_1$ is a cross-sectional area of each mesh edge.

In a sixth step 106, the analysis to the energy transport model is made.

In a seventh step 107, the above first to sixth steps are repeated for all of the bias conditions.

Since in the above method the drift-diffusion model is solved, even if the variation in the bias conditions is large, then the initial value can be obtained which is relatively closer to the solution. As compared to the first to third conventional methods, the above described novel method in accordance with the present invention is superior in accuracy than the first and third conventional methods and also superior in calculation speed than the second conventional method.

In accordance with the present invention, the initial value closer to the solution can be obtained by the calculation in a short time so as to improve the convergence in analysis to the energy transport model for realizing the highly accurate and high speed analysis.

SECOND EMBODIMENT

Figure 13:
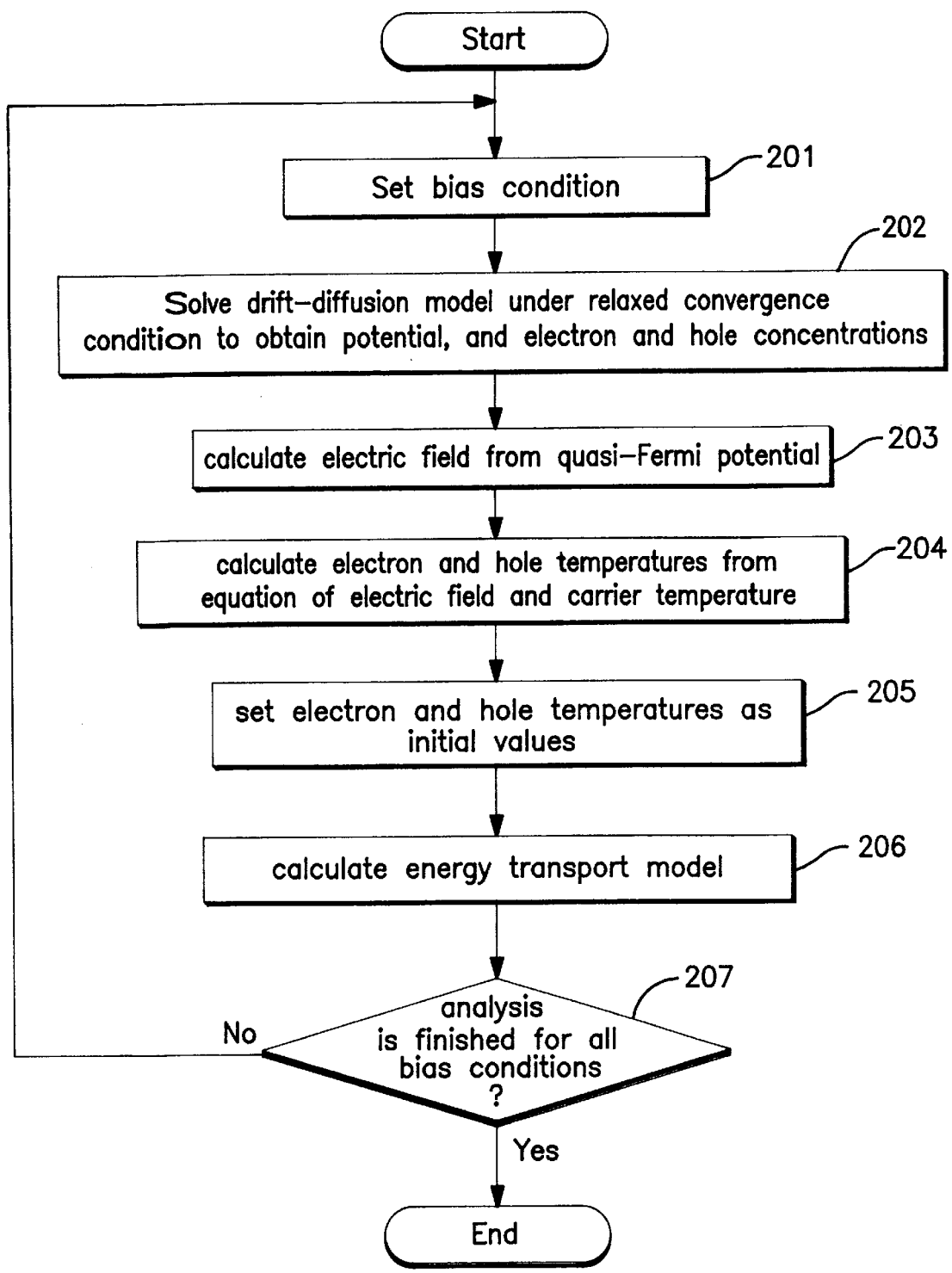
FIG. 13 is a flow chart illustrative of a novel method of numerical simulation to a semiconductor device.

A second embodiment according to the present invention will be described in detail with reference to FIG. 13 which is a flow chart illustrative of a novel method of numerical simulation of a semiconductor device. In a first step 201, individual bias conditions are set. In a second step 202, a drift-diffusion model is solved wherein the convergence condition is relaxed to shorten the required calculation time. Not so highly accurate calculation in the drift-diffusion model for obtaining the initial values are required, for which reason the relaxation of the convergence condition does not provide any substantive influence to the result of the calculation.

As a result of the above calculation, the potential, electron concentration and hole concentration are obtained as solutions of the drift-diffusion model and are different from but relatively closer to the solutions of the energy transport model.

In a third step 203, an electric field is calculated by use of a quasi-Fermi potential in place of the obtained potential. Namely, for electron and hole, the following equations of the fields En and Ep are used.

$$En=-\text{grad}\phi_n \quad (55)$$

$$Ep=-\text{grad}\phi_p \quad (56)$$

$$\phi_n=\upsilon-\{(k_B T)/q\}In(n/n_{ic}) \quad (57)$$

$$\phi_p=\upsilon+\{(k_B T)/q\}In(p/n_{ie}) \quad (58)$$

where $\phi_n$, n is the quasi-Fermi potential of electron, $\phi_p$ is the quasi-Fermi potential of hole, and $n_{ie}$ is the intrinsic carrier concentration.

The field of electrons and holes over the mesh edges may be expressed as follows.

$$E_{n1}=-(\phi_{ni}-\phi_{nj})/L_i \quad (59)$$

$$E_{p1}=-(\phi_{pi}-\phi_{pj})/L_i \quad (60)$$

where Li is the length of mesh edge "1".

In a fourth step 204, carrier temperatures are found from the equation of the obtained electric field and the carrier temperature In a fifth step 205, the obtained carrier temperature is set to be the initial value for the energy transport model analysis.

In a sixth step 206, the analysis to the energy transport model is made.

In a seventh step 207, the above first to sixth steps are repeated for all of the bias conditions.

Since in the above method the drift-diffusion model is solved, even if the variation in the bias conditions is large, then the initial value can be obtained which is relatively closer to the solution. As compared to the first to third conventional methods, the above described novel method in accordance with the present invention is superior in accuracy than the first and third conventional methods and also superior in calculation speed than the second conventional method.

In accordance with the present invention, the initial value closer to the solution can be obtained by the calculation in a short time so as to improve the convergence in analysis to the energy transport model for realizing the highly accurate and high speed analysis.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of developing a semiconductor device simulation, comprising the steps of:

solving a drift-diffusion model to obtain potential, and electron and hole concentrations;

calculating an electric field from the obtained potential;

developing one-to-one temperature-electric field relationships for each of hole and electron temperatures based on the calculated electric field;

determining initial values of hole and electron temperatures from the one-to-one temperature-electric field relationship for each of the hole and electron temperatures;

using the determined initial values of hole and electron temperatures, solving an energy transport model to obtain an energy transport model solution; and developing a semiconductor device simulation based on the energy transport model solution.

2. The method of claim 1, wherein said step of solving a drift-diffusion model to obtain potential, and electron and hole concentrations is performed under relaxed convergence conditions.

3. The method of claim 1, wherein said step of developing one-to-one temperature-electric field relationships for each of hole and electron temperatures based on the calculated electric field is completed by a Monte Carlo simulation.

4. The method of claim 1, wherein said step of calculating an electric field from the obtained potential includes the use of quasi-Fermi potentials to calculate fields of the electrons and holes.

5. A computer-readable storage medium configured by a computer program to develop a semiconductor device simulation, comprising:

storage medium containing a first program portion adapted that upon execution solves a drift-diffusion model to obtain potential, and electron and hole concentrations;

storage medium adapted containing a second program portion that upon execution calculates an electric field from the obtained potential;

storage medium containing a third program portion adapted that upon execution develops one-to-one temperature-electric field relationships for each of hole and electron temperatures based on the calculated electric field;

storage medium containing a fourth program portion adapted that upon execution determines initial values of hole and electron temperatures from the one-to-one temperature-electric field relationship for each of the hole and electron temperatures;

storage medium containing a fifth program portion adapted that upon execution uses the determined initial values of hole and electron temperatures, solving an energy transport model to obtain an energy transport model solution; and storage medium containing a sixth program portion adapted that upon execution develops a semiconductor device simulation based on the energy transport model solution.

6. The storage medium of claim 5, wherein said storage medium containing the first program portion is further adapted to solve the drift-diffusion model to obtain potential, and electron and hole concentrations under relaxed convergence conditions.

7. The method of claim 5, wherein said storage medium containing the third program portion is further adapted to develop one-to-one temperature-electric field relationships for each of hole and electron temperatures based on the calculated electric field being completed by a Monte Carlo simulation.

8. The method of claim 5, wherein said storage medium containing the second program portion is further adapted calculate the electric field from the obtained potential by including the use of quasi-Fermi potentials to calculate fields of the electrons and holes.

9. A programmable apparatus to develop a semiconductor device simulation, comprising:

programmable hardware directed by a software, said software comprising:

a first program portion adapted that upon execution solves a drift-diffusion model to obtain potential, and electron and hole concentrations;

a second program portion that upon execution calculates an electric field from the obtained potential;

a third program portion adapted that upon execution develops one-to-one temperature-electric field relationships for each of hole and electron temperatures based on the calculated electric field;

a fourth program portion adapted that upon execution determines initial values of hole and electron temperatures from the one-to-one temperature-electric field relationship for each of the hole and electron temperatures;

a fifth program portion adapted that upon execution uses the determined initial values of hole and electron temperatures, solving an energy transport model to obtain an energy transport model solution; and a sixth program portion adapted that upon execution develops a semiconductor device simulation based on the energy transport model solution.

10. The programmable apparatus of claim 9, wherein said first program portion is further adapted to solve the drift-diffusion model to obtain potential, and electron and hole concentrations under relaxed convergence conditions.

11. The programmable apparatus of claim 9, wherein said third program portion is further adapted to develop one-toone temperature-electric field relationships for each of hole and electron temperatures based on the calculated electric field being completed by a Monte Carlo simulation.

12. The programmable apparatus of claim 9, wherein said second program portion is further adapted calculate the electric field from the obtained potential by including the use of quasi-Fermi potentials to calculate fields of the electrons and holes.

13. A computer-implemented process of developing a semiconductor device simulation, comprising the steps of:

providing a computer with instructions for solving a drift-diffusion model to obtain potential, and electron and hole concentrations;

providing the computer with instructions for calculating an electric field from the obtained potential;

providing the computer with instructions for developing one-to-one temperature-electric field relationships for each of hole and electron temperatures based on the calculated electric field;

providing the computer with instructions for determining initial values of hole and electron temperatures from the one-to-one temperature-electric field relationship for each of the hole and electron temperatures;

providing the computer with instructions for using the determined initial values of hole and electron temperatures, solving an energy transport model to obtain an energy transport model solution; and obtaining from the computer a semiconductor device simulation based on the energy transport model solution.

14. The computer-implemented process of claim 13, further providing the computer with instruction so that said step of solving a drift-diffusion model to obtain potential, and electron and hole concentrations is performed under relaxed convergence conditions.

15. The computer-implemented process of claim 13, further providing the computer with instruction so that said step of developing one-to-one temperature-electric field relationships for each of hole and electron temperatures based on the calculated electric field is completed by a Monte Carlo simulation.

16. The computer-implemented process of claim 13, further providing the computer with instruction so that said step of calculating an electric field from the obtained potential includes the use of quasi-Fermi potentials to calculate fields of the electrons and holes.

* * * * *